United States Patent
Cheng

(10) Patent No.: US 11,647,550 B2
(45) Date of Patent: May 9, 2023

(54) 4G AUTOMATIC LINK ESTABLISHMENT (ALE) WITH IMPROVED TWO-WAY LINK QUALITY ANALYSIS (LQA) EXCHANGE

(71) Applicant: Rockwell Collins, Inc., Cedar Rapids, IA (US)

(72) Inventor: Ho Ting Cheng, Stittsville (CA)

(73) Assignee: Rockwell Collins, Inc., Cedar Rapids, IA (US)

(*) Notice: Subject to any disclaimer, the term of this patent is extended or adjusted under 35 U.S.C. 154(b) by 118 days.

(21) Appl. No.: 17/220,506

(22) Filed: Apr. 1, 2021

(65) Prior Publication Data

US 2021/0329713 A1    Oct. 21, 2021

Related U.S. Application Data

(60) Provisional application No. 63/011,872, filed on Apr. 17, 2020.

(51) Int. Cl.
*H04W 76/10* (2018.01)
*H04W 76/30* (2018.01)
(Continued)

(52) U.S. Cl.
CPC ........... *H04W 76/10* (2018.02); *H04W 24/08* (2013.01); *H04W 76/30* (2018.02); *H04W 84/042* (2013.01)

(58) Field of Classification Search
CPC ........ H04L 7/10; H04W 76/30; H04W 24/08; H04W 76/10; H04W 76/36; H04W 76/40;
(Continued)

(56) References Cited

U.S. PATENT DOCUMENTS 4,780,885 A    10/1988    Paul et al.
5,930,685 A *  7/1999    Straub ................ H04W 76/10
                                                    455/72

(Continued)

FOREIGN PATENT DOCUMENTS

CA    1230928 A    12/1987
EP    2355393 B1   12/2013
(Continued)

OTHER PUBLICATIONS

R. Prouvez, B. Baynat, H. Khalife, V. Conan and C. Lamy-Bergot, "Modeling Automatic Link Establishment in HF networks," MILCOM 2015—2015 IEEE Military Communications Conference, 2015, pp. 1630-1635, doi: 10.1109/MILCOM.2015.7357678. (Year: 2015).*

(Continued)

*Primary Examiner* — William D Cumming
(74) *Attorney, Agent, or Firm* — Suiter Swantz pc llo

(57) ABSTRACT

A participating unit (PU; e.g., radio system, communications node) for a fourth generation (4G) automatic link establishment (ALE) network is disclosed. The PU initiates a link quality analysis (LQA) exchange with a callee PU of the network by transmitting a link request. The caller PU receives in response to the link request a link confirmation including callee-side LQA data for the reception of the link request, performing LQA measurements based on the reception. In response to the link request, the caller PU terminates the LQA exchange by transmitting to the callee PU a link termination including encoded caller-side LQA data, so data from both sides of the exchange is stored by both PUs.

11 Claims, 7 Drawing Sheets

100: 4G ALE Network
102: Calling PU
104: Callee PU
106: Additional PU
108: Additional PU
110: Control Processor
112: Transceiver Equipment
114: Antenna Elements
116: LQA Exchange
118: Link Setup Request
120: Link Confirmation
122: Caller-to-Callee LQA Data
124: Link Termination
126: Callee-to-Caller LQA Data

(51) Int. Cl.
*H04W 24/08* (2009.01)
*H04W 84/04* (2009.01)

(58) Field of Classification Search
CPC H04W 72/542; H04W 28/0883; H04W 54/00
USPC .......................................... 370/468; 455/72
See application file for complete search history.

(56) References Cited

U.S. PATENT DOCUMENTS

| | | | |
|---|---|---|---|
| 7,092,402 B1* | 8/2006 | Smith .................... | H04L 47/10 |
| | | | 370/468 |
| 8,665,866 B2 | 3/2014 | Manssour et al. | |
| 10,616,090 B2* | 4/2020 | Ross .................... | H04W 24/08 |
| 11,057,937 B2* | 7/2021 | Islam ................ | H04W 74/0833 |
| 11,412,937 B2* | 8/2022 | Ahmad ................ | A61B 5/7257 |
| 11,425,605 B1* | 8/2022 | Cheng .................. | H04W 76/40 |
| 11,438,201 B2* | 9/2022 | Wu ........................ | H03F 3/245 |
| 2018/0331935 A1* | 11/2018 | Ross ................ | H04W 28/0883 |
| 2021/0328841 A1* | 10/2021 | Wu .................... | H03K 5/00006 |
| 2021/0329713 A1* | 10/2021 | Cheng .................. | H04W 76/30 |
| 2021/0368338 A1* | 11/2021 | Lord .................... | H04W 64/00 |
| 2022/0070862 A1* | 3/2022 | Li ........................ | H04W 72/542 |
| 2022/0209779 A1* | 6/2022 | Herbsommer ............ | H03L 7/26 |
| 2022/0252713 A1* | 8/2022 | Nasr ...................... | G01S 13/583 |
| 2022/0321153 A1* | 10/2022 | Lee .......................... | H04B 1/04 |
| 2022/0330134 A1* | 10/2022 | Yamasaki ............. | H04W 76/30 |

FOREIGN PATENT DOCUMENTS

| | | | | |
|---|---|---|---|---|
| EP | 3897070 A1 * | 10/2021 | ............ | H04W 24/08 |
| GB | 2133253 B | 8/1986 | | |
| WO | WO-2018208601 A1 * | 11/2018 | ........... | H04B 7/0617 |
| WO | WO-2021131336 A1 * | 7/2021 | ........... | H04B 7/0617 |
| WO | WO-2021131656 A1 * | 7/2021 | ........ | H04W 28/0226 |

OTHER PUBLICATIONS

"IEEE Standard for Telecommunications and Information Exchange Between Systems—LAN/MAN—Specific Requirements—Part 15: Wireless Medium Access Control (MAC) and Physical Layer (PHY) Specifications for Wireless Personal Area Networks (WPANs)," in IEEE Std 802.15.1-2002 ,, Jun. 14, 2002 (Year: 2002).*
Department of Defense Interface Standard, MIL-STD-188-141D, "Inoperability and Performance Standards for Medium and High Frequency Radio Systems", Appendix G, Dec. 27, 2011, pp. 315-336.

* cited by examiner

120

| | 7 | 6 | 5 | 4 | 3 | 2 | 1 | 0 |
|---|---|---|---|---|---|---|---|---|
| 212 → | 0 | 1 | 1 | 1 | 0 | 1 | VM | |
| | - | - | S | N | R | - | EC | |
| 202 → Caller Address | MSB - - - - - - <br> - - - - - - - LSB | | | | | | | |
| 204 → Called Address | MSB - - - - - - <br> - - - - - - - LSB | | | | | | | |
| 206 → Tx Subchannels | bin15 - - - - - - <br> - - - - - - bin0 | | | | | | | |
| 208 → Rx Subchannels | bin15 - - - - - - <br> - - - - - - bin0 | | | | | | | |
| 210 → CRC | - - - - - - - MSB <br> LSB - - - - - - - | | | | | | | |

FIG. 2

4G AUTOMATIC LINK ESTABLISHMENT (ALE) WITH IMPROVED TWO-WAY LINK QUALITY ANALYSIS (LQA) EXCHANGE

RELATED APPLICATIONS

U.S. Provisional Patent Application Ser. No. 63/011,872 entitled 4G AUTOMATIC LINK ESTABLISHMENT (ALE) WITH IMPROVED TWO-WAY LINK QUALITY ANALYSIS (LQA) EXCHANGE, filed Apr. 17, 2020;

Said U.S. Provisional Patent Application 63/011,872 is herein incorporated by reference in its entirety.

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

TECHNICAL FIELD

The subject matter disclosed herein is directed generally to fourth generation (4G) Automatic Link Establishment (ALE) systems networks and more particularly to link quality analysis (LQA) operations for 4G ALE systems.

BACKGROUND

Radio systems within a fourth generation (4G) automatic link establishment (ALE) network may periodically be instructed to perform link quality analysis (LQA) exchanges. However, the current protocol for said LQA exchanges does not provide for full LQA data availability on both sides of the exchange.

SUMMARY

In a first aspect, a participating unit (PU) of a fourth generation (4G) automatic link establishment (ALE) network is disclosed. In embodiments, the PU includes a 4G ALE radio system configured for initiating link quality analysis (LQA) exchanges with a receiving PU (RxPU) of the network by transmitting to the receiving PU a link request. The PU receives in response a link confirmation from the receiving PU, the link information including encoded LQA data associated with the reception of the link request by the receiving PU (e.g., based on LQA measurements performed by the receiving PU). The PU in turn performs LQA measurements associated with the reception of the link confirmation (e.g., whereby the PU has LQA data for both sides of the LQA exchange). The PU encodes this second set of LQA measurements and transmits the encoded LQA data to the receiving PU pursuant to terminating the LQA exchange, so that the receiving PU similarly has LQA data for both sides of the LQA exchange.

In some embodiments, the second set of LQA measurements is encoded into a link termination protocol data unit (PDU) transmitted to the receiving PU.

In some embodiments, the 4G ALE radio system terminates the LQA exchange by transmitting a link termination PDU to the receiving PU, appending the second set of LQA measurements as an additional PDU.

In some embodiments, the appended PDU includes a text message.

In some embodiments, the appended PDU includes a binary message.

In some embodiments, the LQA measurements include a signal to noise ratio (SNR) measurement and/or a signal to noise and distortion (SINAD) measurement.

In a further aspect, a method for link quality analysis (LQA) in a fourth generation (4G) automatic link establishment (ALE) network is also disclosed. In embodiments, the method includes initiating, via a first (e.g., caller) participating unit (PU) of the network, a link quality exchange (LQA) with a receiving (e.g., callee) PU (RxPU) of the network by transmitting a link request to the callee PU/RxPU. The method includes receiving, in response to the link request, a link confirmation from the callee PU; the link confirmation includes encoded LQA data associated with the caller-to-callee transmission of the link request and the reception thereof by the callee PU. The method includes performing, via the caller PU, LQA measurements associated with the callee-to-caller transmission of the link confirmation and the reception thereof by the caller PU. The method includes encoding, via the caller PU, the callee-to-caller LQA measurements. The method includes transmitting the encoded callee-to-caller LQA measurements to the callee PU pursuant to terminating the LQA link exchange.

In some embodiments, the method includes performing an SNR measurement and/or SINAD measurement based on the reception of the link confirmation PDU In some embodiments, the method includes terminating the LQA exchange by transmitting a link termination PDU in response to the link confirmation PDU.

In some embodiments, the method includes terminating the LQA exchange by transmitting a link termination PDU (not including the LQA measurements associated with the callee-to-caller transmission of the link confirmation PDU) in response to the link confirmation PDU, and appending the encoded callee-to-caller LQA measurements as an additional PDU.

In some embodiments, the method includes appending the encoded callee-to-caller LQA measurements as a message PDU.

In some embodiments, the method includes appending the encoded callee-to-caller LQA measurements as a text message PDU.

In some embodiments, the method includes appending the encoded callee-to-caller LQA measurements as a binary message PDU.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 2 is a diagrammatic illustration of a link confirmation protocol data unit (PDU) of the 4G ALE network of FIG. 1;

DETAILED DESCRIPTION

Figure 1:
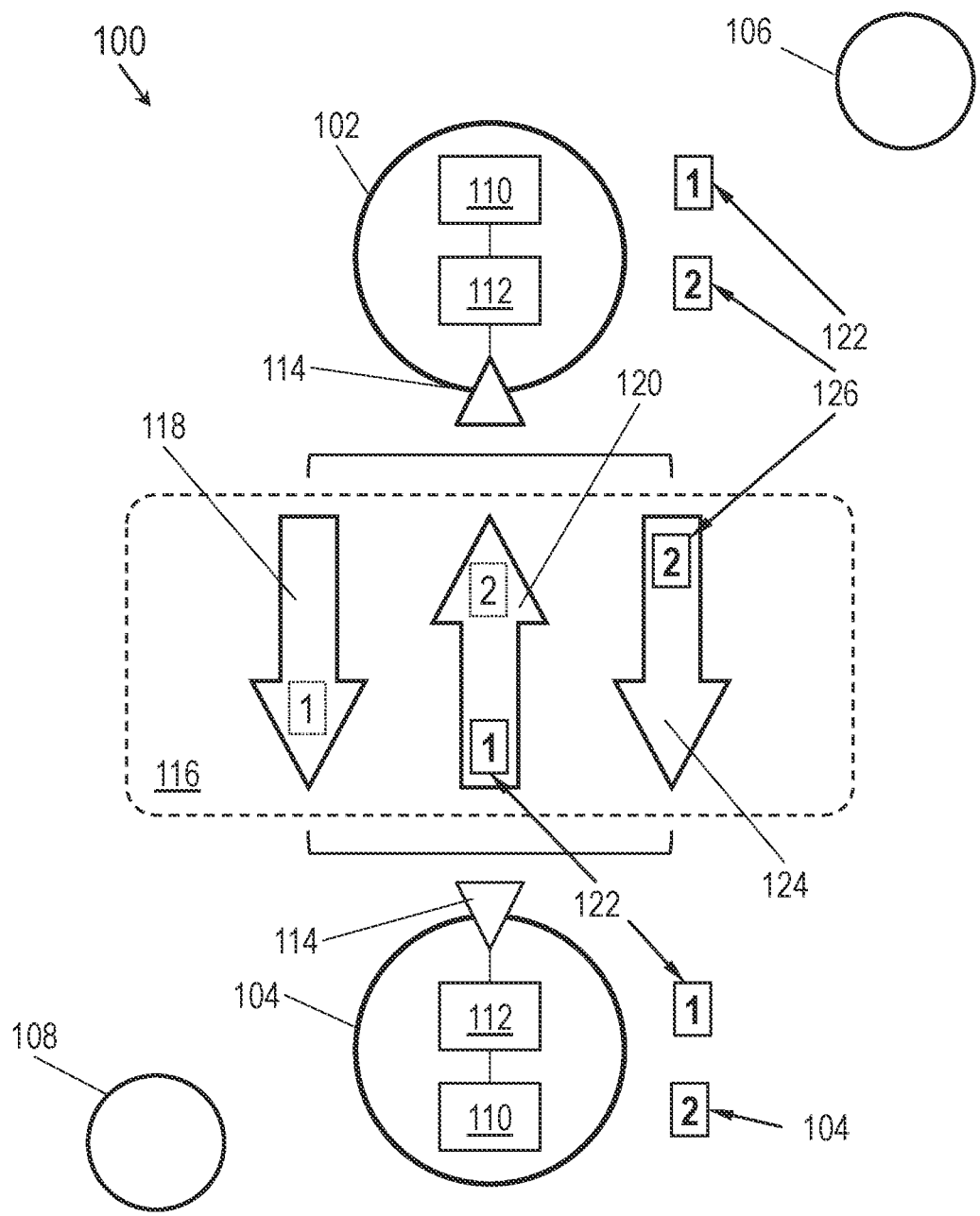
FIG. 1 is a block diagram illustrating a fourth generation (4G) automatic link establishment (ALE) network in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a fourth generation (4G) automatic link establishment (ALE) network 100 is disclosed. The 4G ALE network may include participating units (PU) 102, 104, 106, 108.

In embodiments, each PU 102-108 of the network 100 may include a 4G ALE radio system capable of scanning through a series of channels (e.g., adjacent frequency bands generally between 1.5 kHz and 48 kHz in width) to determine which channels are, at any given time, best for internodal communication. For example, MIL-STD-188-141D outlines United States military standards regarding the interoperability and performance of medium-frequency (MF) and/or high-frequency (HF; e.g., transmitting and receiving in the frequency range from 2 to 30 MHz) radio systems. These standards include prescribed waveforms, signal structures, protocols, and performance requirements for 4G ALE and/or Wideband ALE (WALE) systems.

In embodiments, each PU 102-108 may include control processors 110, transceiver equipment 112 (e.g., signal filters, signal amplifiers), and antenna elements 114 for transmitting and receiving data along MF, HF, Wideband HF (WBHF), ALE, and/or WALE channels. Each PU 102-108 may assess the link quality of a given link to another PU each time a data packet or message is received via that link. However, in order to continually and accurately rank all available channels (e.g., in terms of calling, traffic, signal to noise ratio (SNR), signal to noise and distortion ratio (SI-NAD)), any PU 102 within the 4G ALE network 100 may periodically be commanded to execute a Link Quality Analysis (LQA) exchange 116 with another PU 104 of the said 4G ALE network.

In embodiments, the calling PU 102 (e.g., caller, transmitting PU (TxPU)) may initiate the LQA exchange 116 by contacting (e.g., calling) the callee PU 104 (e.g., receiving PU (RxPU)) on a specified 4G ALE channel and according to any and all appropriate timing protocols. For example, the calling PU 102 may listen before transmitting (LBT; e.g., to ensure the absence of other traffic on the specified channel) and transmit a link setup request 118 to the callee PU 104. The callee PU 104 may measure SNR, SINAD, and any other LQA factors affecting reception of the link setup request 118.

In embodiments the callee PU 104, upon receipt of the link setup request 118, may listen before responding (LBR) and respond to the link setup request with a link confirmation 120 including the caller-to-callee LQA data (122) collected per the reception of the link setup request 118. Similarly, while receiving the link confirmation 120, the calling PU 102 may measure SNR, SINAD, and/or any other LQA factors affecting its reception. Upon reception of the link confirmation 120, the calling PU 102 may terminate the LQA exchange 116 by transmitting a link termination 124 to the callee PU 104. Upon reception of the link confirmation 120, the calling PU 102 may have caller-to-callee LQA data 122 (e.g., corresponding to the transmission of the link setup request 118 to the callee PU 104 and the reception thereof by the callee PU) and callee-to-caller LQA data 126 (e.g., corresponding to the response transmission of the link confirmation 120 in the opposite direction and the reception thereof by the calling PU 102). However, under the conventional standards for establishing the LQA exchange 116, the callee PU 104 would have only the caller-to-callee LQA data 122; e.g., LQA data for only one direction of the LQA exchange.

In embodiments, the calling PU 102 may solve this problem (e.g., without otherwise altering or violating the LQA exchange standard) by providing the callee-to-caller LQA data 126 to the callee PU 104 within the link termination 124. In this way, the PUs 102, 104 on both sides of the link may each store LQA data 122, 126 for both directions of the LQA exchange 116.

Referring to FIG. 2, a link confirmation 120 is shown.

In embodiments, the link confirmation 120 may be encoded and transmitted according to a particular protocol data unit (PDU) having a format partially provided for by standards governing the LQA exchange (116, FIG. 1). For example, the link confirmation 120 may include fields (e.g., bytes, octets) reserved for the caller address 202 (e.g., identifying the calling PDU (102, FIG. 1)); the callee address 204 (e.g., identifying the callee PDU (104, FIG. 1)); transmission (Tx) subchannels 206; reception (Rx) subchannels 208; and cyclic redundancy check (CRC) fields 210.

In embodiments, the PDU for the link confirmation 120 may reserve an SNR field 212 (e.g., of N bits, where N is an integer; here N=6) expressly for caller-to-callee LQA data 122. For example, as noted above, the callee PU 104 may measure SNR, SINAD, and other relevant caller-to-callee LQA factors pursuant to the reception of the link request PDU (118, FIG. 1). A raw SNR, for example, between −10 dB and 53 dB may be shifted (e.g., by 10, or to an SNR value between 0 and 63) and encoded, e.g., round (SNR/(64/pow (2, N)))

where N is, as noted above, the number of bits in the reserved SNR field 212.

Figure 3A:
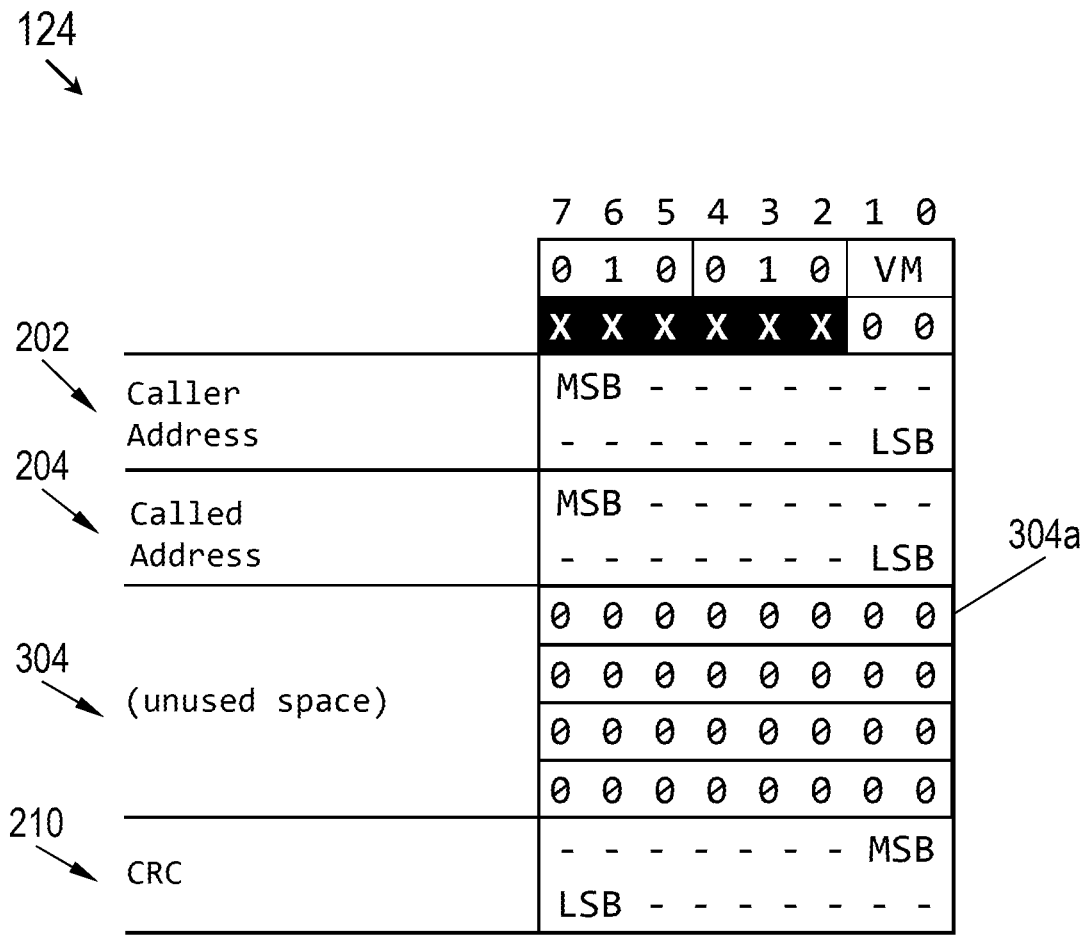
FIG. 3A is a diagrammatic illustration of a link termination PDU of the 4G ALE network of FIG. 1.

Referring now to FIG. 3A, the link termination 124 is shown.

In embodiments, similarly to the link confirmation 120 shown above by FIG. 2, the link termination 124 may include caller address fields 202, callee address fields 204, and CRC fields 210. However, the link termination 124 reserves the fields corresponding to the SNR fields (212, FIG. 2) of the link confirmation 120 for a REASON field 302 including encoded information relevant to the termination of a link. For example, when the link termination 124 is transmitted to terminate the LQA exchange (116, FIG. 1), the REASON field 302 is set to 0 0 0 0 0 0 (e.g., meaning NO_MORE_TRAFFIC). Accordingly, to provide encoded callee-to-caller LQA data (126, FIG. 1) within the REASON field 302 would violate the LQA exchange standards. However, for the calling PDU 102 to respond to the link confirmation 120 by transmitting a second link confirmation to the callee PDU (and thereby providing callee-to-caller LQA data 126 within the SNR field thereof) would also violate LQA exchange standards, which provide that the link confirmation 120 must be responded to via a link termination 124 terminating the LQA exchange 116.

Figure 3B:
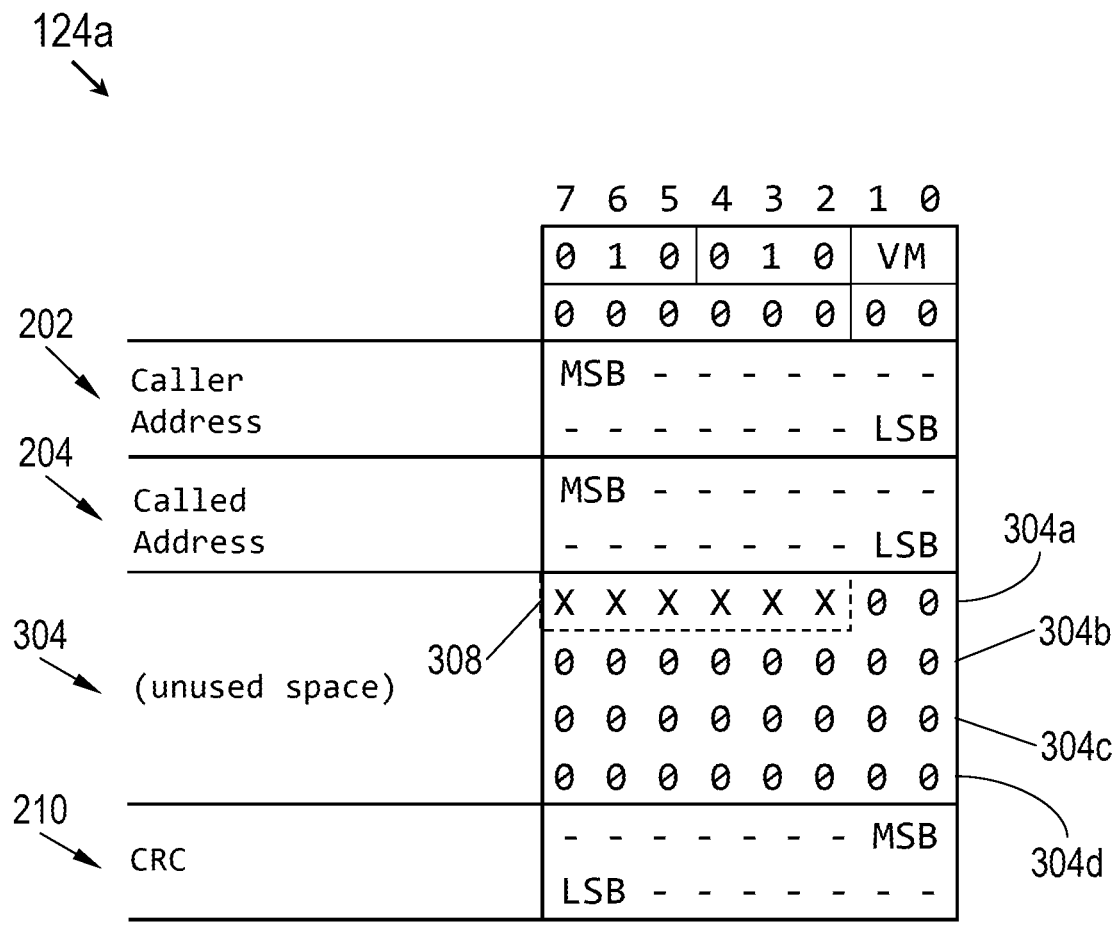
FIG. 3B is a diagrammatic illustration of the link termination PDU of FIG. 3A.

Referring now to FIG. 3B, the link termination 124a may be implemented similarly to the link termination 124 of FIG. 3A, except that in embodiments, the link termination 124a may adapt otherwise unused space within its PDU to incorporate callee-to-caller LQA data (126, FIG. 1). For example, the link termination 124a, similarly to the link termination 124, may incorporate several bytes of unused space 304 not otherwise assigned (e.g., unused bytes 7-10 (304a-d)). Bits 2-7 of the unused byte 7 (304a) (or, alternatively, any other contiguous group of similarly otherwise unused bits) may be converted into an SNR field 308 wherein the callee-to-caller LQA data 126 may be inserted. For example, if the received link confirmation (120, FIG. 2) includes a six-bit SNR field (212, FIG. 2), the SNR field 308 may similarly be six bits in length; in some embodiments the length of the SNR field 308 may be adjusted based on the length of the SNR field 212 or according to any other relevant considerations.

In embodiments, the caller PDU 102 may transmit the link termination 124a to the callee PU 104, terminating the LQA exchange 116 according to the required standards while ensuring that the PUs 102, 104 on both sides of the LQA exchange have LQA data 122, 126 for both directions of the LQA exchange.

Figure 4:
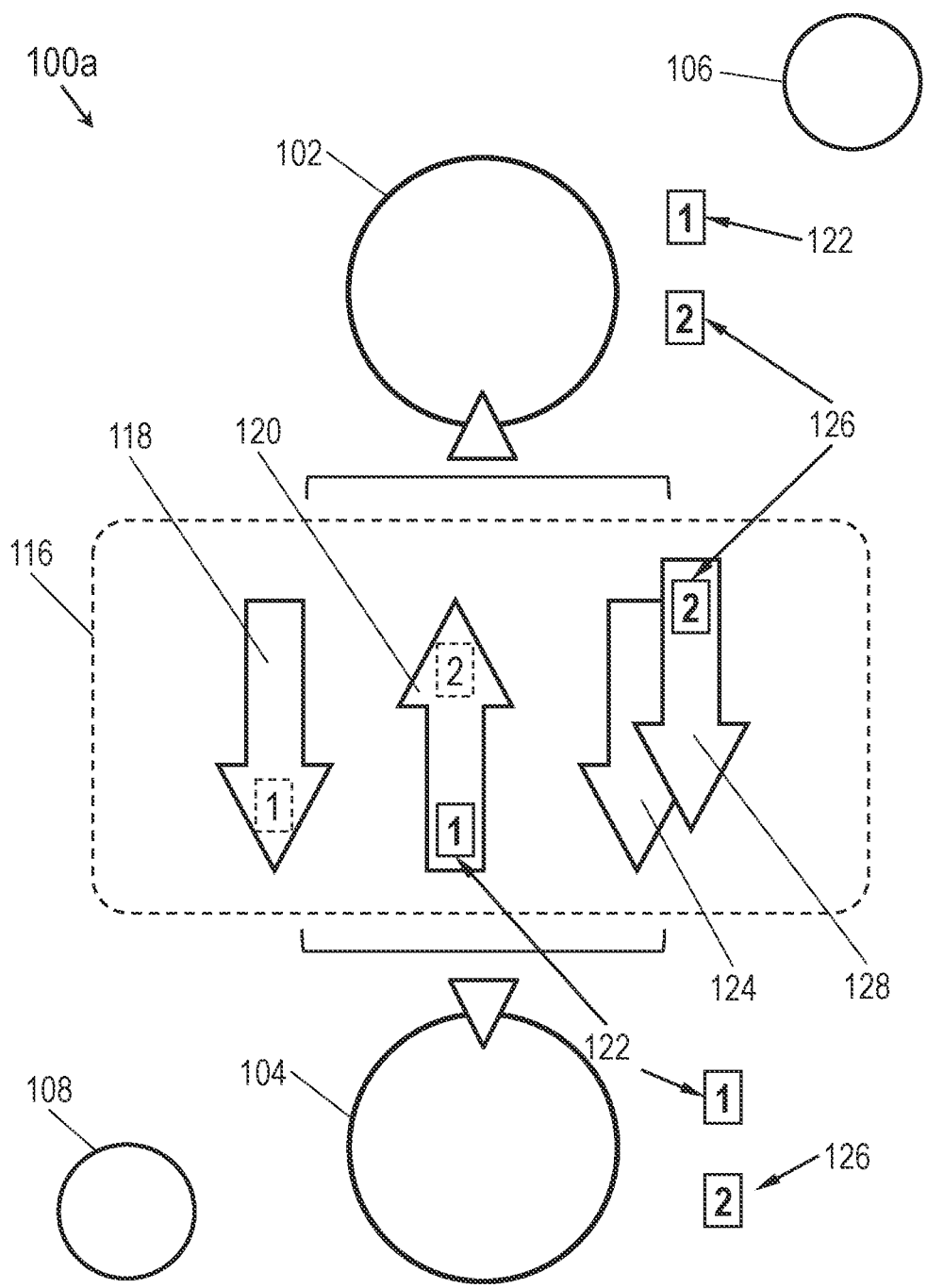
FIG. 4 is a diagrammatic illustration of the 4G ALE network of FIG. 1.

Referring now to FIG. 4, the 4G LQA network 100a may be implemented and may function similarly to the LQA network 100 of FIG. 1, except that the 4G LQA network 100a may utilize an alternative means of providing bi-directional LQA data (e.g., caller-to-callee LQA data 122, callee-to-caller LQA data 126) to the PUs 102, 104 on either side of a LQA exchange 116 (e.g., including a link setup request 118 and a link confirmation 120).

In embodiments (while, it should be noted, the termination of the LQA exchange 116 via transmission of the link termination (124a, FIG. 3B) including callee-to-caller LQA data 126 fully complies with MIL-STD-188-141D), the PU 102 may instead terminate the LQA exchange 116 by transmitting a compliant link termination 124 not including callee-to-caller LQA data and appending to the compliant link termination an additional PDU 128 (e.g., a Text_Msg PDU or other type of message PDU), the appended PDU 128 including the callee-to-caller LQA data 126 (e.g., embedded in one or more message octets of the appended PDU).

Figure 5A:
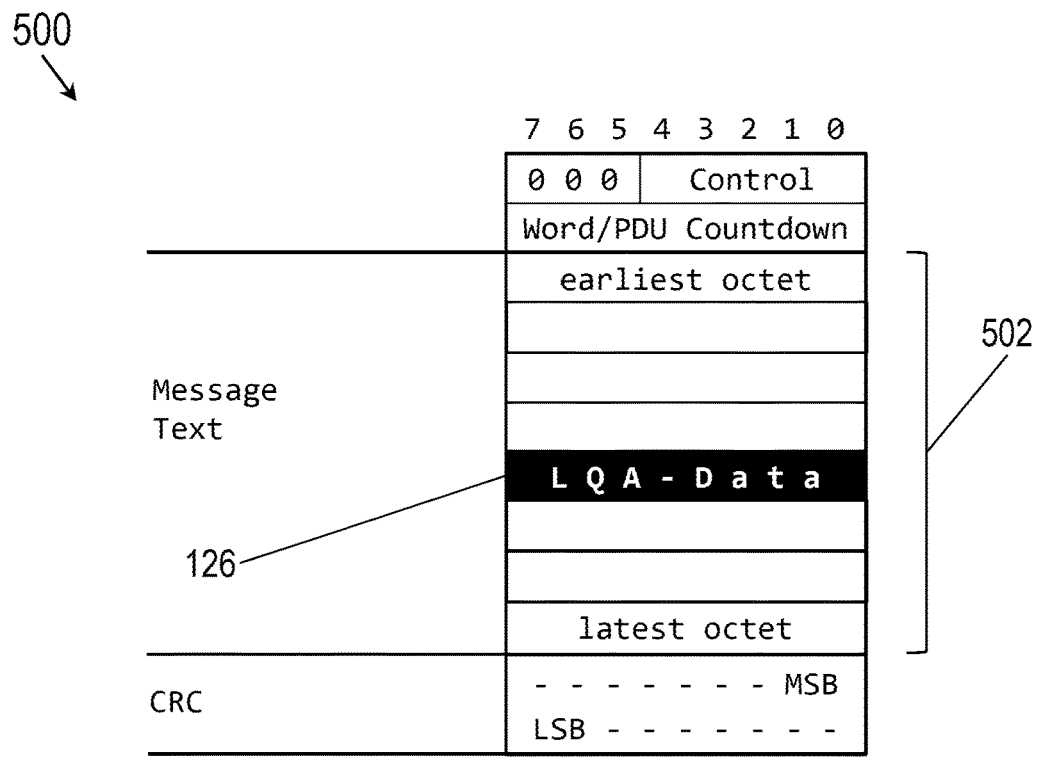
FIG. 5A is a diagrammatic illustration of an appended text message PDU of the 4G ALE network of FIG. 4.
Figure 5B:
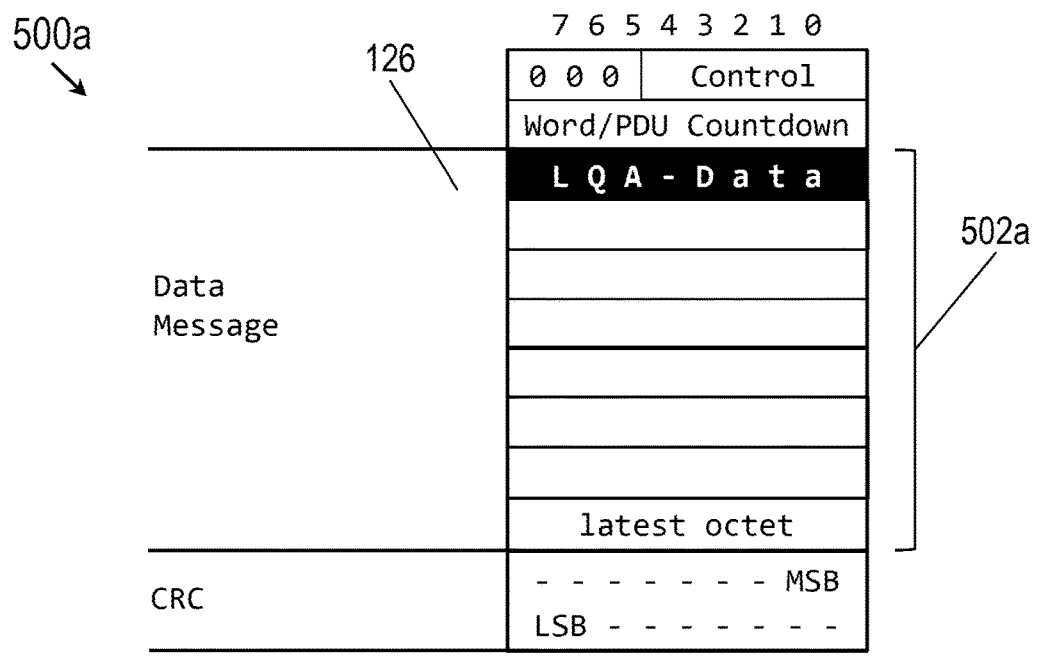
FIG. 5B is a diagrammatic illustration of an appended binary message PDU of the 4G ALE network of FIG. 4.

Referring to FIGS. 5A and 5B, the text message PDU 500 and binary message PDU 500a are disclosed.

In embodiments, referring in particular to FIG. 5A, the callee-to-caller LQA data 126 may be left out of the compliant link termination (124, FIG. 4) as described above and embedded in an appended PDU. For example, the text message PDU 500 may be appended to the compliant link termination 124. The text message PDU 500 may incorporate up to eight message octets 502 of content (e.g., with respect to the text message PDU the message octets may include human-readable text). The callee-to-caller LQA data 126 may be encoded and embedded in one or more message octets 502 of the text message PDU 500.

Referring now to FIG. 5B, the binary message PDU 500 may be implemented similarly to the text message PDU 500, except that the message octets 502a of the binary message PDU 500a may include machine-readable binary message data. In embodiments, the callee-to-caller LQA data 126 may be encoded and embedded in one or more message octets 502a, and the binary message PDU 500 appended to the compliant link termination 124.

Figure 6:
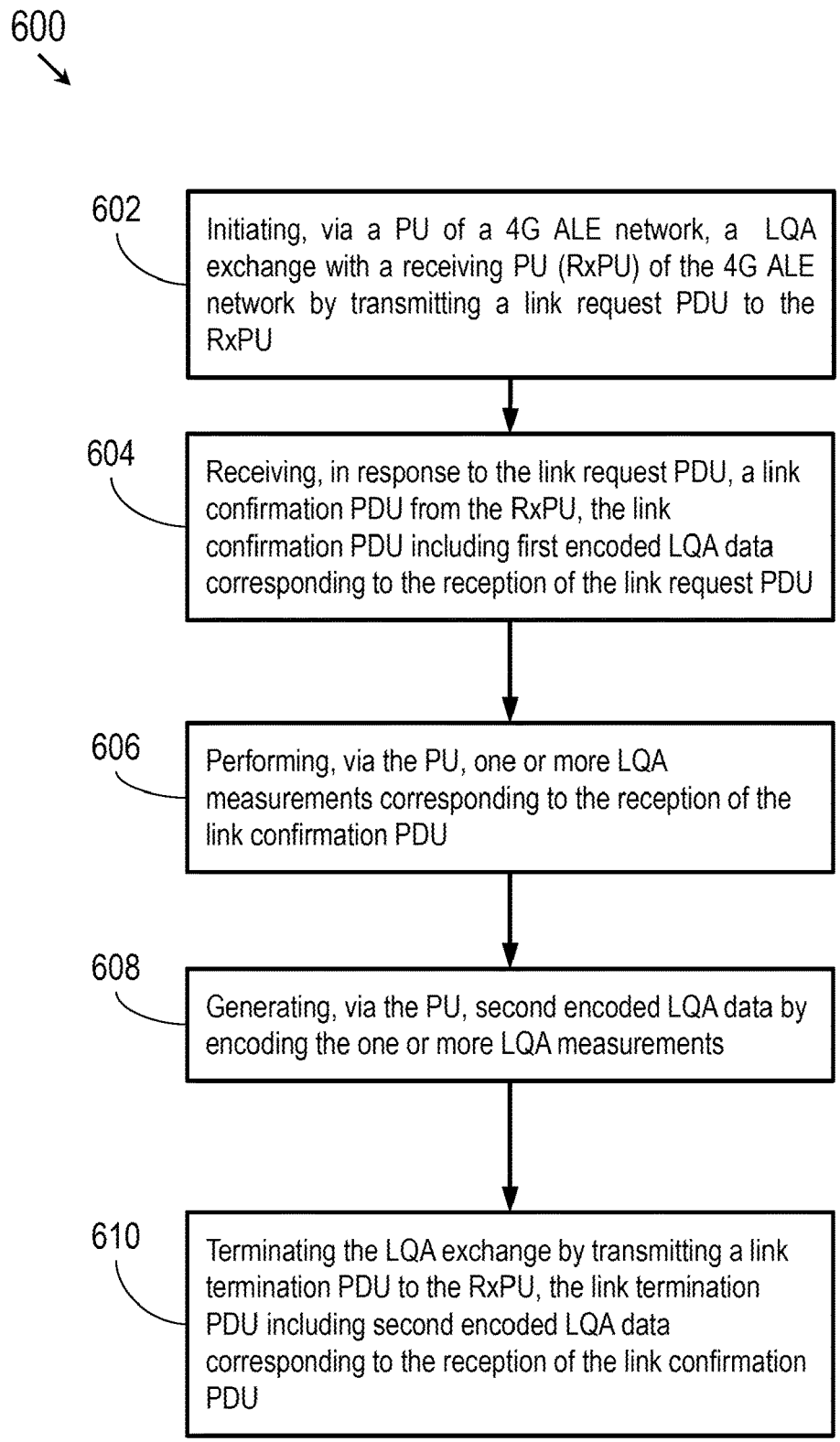
FIG. 6 is a flow diagram illustrating a method for link quality analysis (LQA), in accordance with example embodiments of this disclosure.

Referring to FIG. 6, the method 600 may be implemented by participating units (PU) of the 4G ALE networks 100, 100a and may include the following steps.

At a step 602, a caller PU (e.g., instructed to initiate a link quality analysis (LQA) exchange with a callee PU) initiates the LQA exchange by transmitting a link request protocol data unit (PDU) to the callee PU.

At a step 604, the caller PU receives a link confirmation PDU from the callee PDU, the link confirmation PDU including caller-to-callee LQA data measured pursuant to the reception of the link request PDU by the callee PU. For example, caller-to-callee LQA data (or callee-to-caller LQA data, as referenced below) may incorporate callee-side signal-to-noise ratio (SNR) measurements and/or signal to noise and distortion (SINAD) measurements.

At a step 606 the caller PU performs one or more LQA measurements corresponding to the reception of the link confirmation PDU from the callee PU. For example, the caller PU may measure caller-side SNR, SINAD, or other LQA factors.

At a step 608 the caller PU generates caller-side encoded LQA data by encoding the caller-side LQA measurements.

At a step 610, the caller PU terminates the LQA exchange by transmitting a link termination PDU to the callee PU, the link termination PDU including callee-to-caller LQA data measured pursuant to the reception of the link confirmation PDU by the calling PU. For example, the callee-to-caller LQA data may be encoded into the link termination PDU sent in response to the link confirmation PDU, and terminating the LQA exchange. In some embodiments, the caller PU may terminate the LQA exchange by transmitting a link termination PDU without callee-to-caller LQA data, appending to the link termination PDU an additional message PDU including the callee-to-caller LQA data. For example, the appended PDU may be a text message PDU or a binary message PDU.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A participating unit (PU) in a fourth generation (4G) automatic link establishment (ALE) network, comprising a 4G ALE radio system configured to:
   1) Initiate at least one link quality analysis (LQA) exchange with a receiving PU (RxPU) of the 4G ALE network by transmitting a link request to the RxPU;
   2) Receive from the RxPU a link confirmation in response to the link request, the link confirmation including first encoded LQA data corresponding to the reception of the link request;
   3) perform one or more LQA measurements corresponding to the reception of the link confirmation;
   4) Generate second encoded LQA data by encoding the one or more LQA measurements;
   5) terminate the LQA exchange by transmitting to the RxPU second encoded LQA data corresponding to the reception of the link confirmation;
   6) Terminate the LQA exchange by transmitting to the RxPU a link termination PDU; and
   7) append to the link termination PDU an additional PDU including the second encoded LQA data.

2. The PU of claim 1, wherein the second encoded LQA data is encoded into a link termination protocol data unit (PDU) transmitted to the RxPU.

3. The PU of claim 1, wherein the additional PDU includes a text message PDU.

4. The PU of claim 1, wherein the additional PDU includes a binary message PDU.

5. The PU of claim 1, wherein the one or more LQA measurements are selected from a group including a signal to noise ratio (SNR) measurement and a signal to noise and distortion (SINAD) measurement.

6. A method for link quality analysis (LQA) in a fourth generation (4G) automatic link establishment (ALE) network, the method comprising:

initiating, via a calling participating unit (PU) of a 4G ALE network, a link quality analysis (LQA) exchange with a receiving PU (RxPU) of the 4G ALE network by transmitting a link request protocol data unit (PDU) to the RxPU;

receiving, in response to the link request PDU, a link confirmation PDU from the RxPU, the link confirmation PDU including first encoded LQA data corresponding to the receiving of the link request PDU;

performing, via the calling PU, one or more LQA measurements corresponding to the receiving of the link confirmation PDU;

generating, via the calling PU, second encoded LQA data by encoding the one or more LQA measurements;

terminating the LQA exchange by transmitting a link termination PDU to the RxPU, the link termination PDU including the second encoded LQA data;
and terminating the LQA exchange by transmitting a link termination PDU in response to the link confirmation PDU, the link termination PDU not including the second encoded LQA data;
and appending to the link termination PDU at least one additional PDU including the second encoded LQA data.

7. The method of claim 6, wherein performing, via the PU, one or more LQA measurements corresponding to the receiving of the link confirmation PDU includes:

performing, via the PU, one or more of a signal to noise ratio (SNR) measurement and a signal to noise and distortion (SINAD) measurement corresponding to the receiving of the link request PDU.

8. The method of claim 6, wherein terminating the LQA exchange by transmitting a link termination PDU to the RxPU, the link termination PDU including the second encoded LQA data includes:

terminating the LQA exchange by transmitting the link termination PDU in response to the link confirmation PDU.

9. The method of claim 6, wherein appending to the link termination PDU at least one additional PDU including the second encoded LQA data includes:

appending to the link termination PDU at least one message PDU including the second encoded LQA data.

10. The method of claim 9, wherein appending to the link termination PDU at least one message PDU including the second encoded LQA data includes:

appending to the link termination PDU at least one text message PDU including the second encoded LQA data.

11. The method of claim 9, wherein appending to the link termination PDU at least one message PDU including the second encoded LQA data includes:

appending to the link termination PDU at least one binary message PDU including the second encoded LQA data.

* * * * *